3,690,893
TORTILLA AND PROCESS USING EPICHLOROHYDRIN
Manuel Jesus Rubio, Bridgeport, Conn., assignor to Roberto Gonzalez Barrera, Monterrey, Nuevo Leon, Mexico
No Drawing. Filed July 24, 1970, Ser. No. 58,142
Int. Cl. A23l 1/10
U.S. Cl. 99—80 R    2 Claims

ABSTRACT OF THE DISCLOSURE

To retard the staling of tortillas, which are an unleavened unshortened food product made from nixtamalized corn or corn flour by incorporating an additive in making the tortilla dough. The additive is epichlorohydrin.

DISCLOSURE OF THE INVENTION

The present invention relates to retarding the staling of tortillas and increasing the yield of tortilla dough and tortillas.

Many expedients which apply for preventing staling to the usual wheat, whole wheat or rye bread, commonly eaten, are not effective when applied to tortillas because of the marked differences in their composition from the breads mentioned above. Among these differences are:

(1) Tortillas are made from whole corn, that is, corn which contains its germ, hull, bran, etc. Bread is made from dehulled, degermed and debranned wheat.

(2) Dehulled, degermed, debranned wheat used in making bread undergoes no chemical treatment before grinding. Whole corn used in making tortillas always undergoes the chemical treatment of steeping in limewater at pH 12 before grinding.

(3) Dehulled, degermed, debranned wheat used in making bread is ground into a flour in the dry state. Steeped whole corn used in making tortillas is ground into a dough in the wet state, after which the dough is either dried into a flour or used directly to make tortillas.

(4) The dough used for making bread is always prepared from dry dehulled, degermed, debranned wheat flour. The dough used for making tortillas may be prepared either from dry limed whole corn flour or directly by grinding whole corn steeped in limewater at pH 12.

(5) In addition to dehulled, degermed, debranned wheat flour, the dough used for making bread always contains some of the following ingredients: shortening, a leavening agent (yeast, air, or baking powder), salt, sugar, milk solids or milk, eggs or egg solids, and water. Dough used in making tortillas only contains ground limed whole corn and water.

(6) The final moisture content of bread after baking is approximately 20%; that of tortillas after cooking is approximately 45%. Due to its lower moisture content, bread is much less subject to microbial spoilage than tortialls.

(7) Bread is baked inside an oven by hot air at a temperature of 425–500° F. for 30–60 minutes. Tortillas are cooked on a hot plate at 290–410° F., each side or face being exposed alternately to the heat for 15–20 seconds, after which the first side is again exposed for an additional 15–20 seconds.

(8) Other differences between bread and tortillas are the following:

(a) Dehulled, degermed, debranned wheat flour used in breadmaking is usually bleached; limed corn flour used for making tortillas is never bleached.

(b) Bread is usually leavened; tortillas are never leavened.

(c) Bread is always baked in the shape of loaves or rolls, tortillas are always shaped in the form of round, flat discs.

(d) The structure of bread is largely due to the presence of proteins known as "glutelin and gliadin" which are components of dehulled, degermed, debranned wheat. Corn contains no such protein, so that the structure of tortillas is due mostly to their starch component.

The base material for making tortillas is limed corn dough, whose preparation is described below.

Flat discs of dough of diameter 4–6 inches and height 2–3 millimeters are prepared either by hand, by use of any mechanical equipment which squashes or presses pieces of dough, or by any suitable automatic machine.

After they have been made, the flat discs of dough are cooked on a hot plate whose temperature varies from 290–410° F. In the cooking process, each face or side of the disc is alternately exposed to the heat for 15–20 seconds, after which the first side is again exposed for an additional 15–20 seconds.

The cooked discs or tortillas have a moisture content of 40–48% and are ready to eat.

Limed corn dough may be prepared from limed corn flour of size smaller than 45 U.S. Standard Mesh, 8–12% moisture content and pH 6–7. The dough is made by mixing 1.0–1.4 pounds of tap water per pound of flour.

Limed corn dough may also be made directly by grinding corn which has been stepped in limewater. In such case 1 pound of corn is steeped overnight in 0.5–0.8 pound of water, initially at boiling temperature, which contains 0.5–1.5% calcium hydroxide. It should be noted that when the corn is added to the limewater, the latter is either at or close to its boiling temperature. However, after both ingredients have been mixed, no further heat is applied so that the temperature of the mixture drops gradually during the steeping process.

It might be mentioned that tortillas, when normally prepared as described herein and without additives of any kind, have a maximum shelf life of 12–15 hours. After such time they are spoiled by microorganisms and become hard or stale.

It is known that tortillas when kept under conditions in which no moisture is lost, nevertheless become hard and inflexible with the passage of time and break or crumble easily when flexed or bent. This effect increases with time. Freshly made tortillas are very flexible but lose their flexibility with the passage of time. Hardening is appreciable after twenty-four hours, marked after forty-eight hours and almost complete after seventy-two hours if the product is kept at room temperature. It should be noted that the hardening or staling effect increases with decreasing temperature until the freezing point of water in the product is reached. At temperatures below room temperature but above the freezing point of water in the tortillas, therefore, hardening proceeds at a faster rate than at room temperature and vice-versa.

In determining the flexibility index a tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds therefore to bars of lower radii and indicates higher flexibility.

Table 1 gives typical values for variation of the flexibility index or tortillas with time at room temperature.

TABLE 1

Variation of the flexibility index of tortillas with time at room temperature

Flexibility index after the following elapsed time:
```
  0 hr. ----------------------------------- 8.5
 24 hr. ----------------------------------- 7.7
 48 hr. ----------------------------------- 6.5
 72 hr. ----------------------------------- 6.0
 96 hr. ----------------------------------- 5.5
```

Harding or loss of flexibility of tortillas is believed to be due to a physico-chemical change in the starch constituent of tortillas which is known as retrogradation. This phenomenon has been studied in substances other than tortillas and is described in the technical literature (Whistler 1965).

The additive of the present invention imparts the property of retarding the loss of flexibility of tortillas with time. It must be mixed with the dough used for making tortillas, although as later explained, the mixture may be achieved in various ways.

Thus, in respect to this aspect of the invention, tortillas stored under conditions in which no moisture is lost from them become stale more slowly because of the additive of the invention, which retards hardening with time, retards loss of flexibility with time, increases the freshness of the tortillas, prolongs the flexible shelf life of the tortillas and increases the freshness of both freshly made tortillas and also reheated tortillas.

INTRODUCING THE ADDITIVE INTO THE DOUGH

The additive may be introduced into the dough in any of several different ways. It may be added to the dough as an aqueous solution or suspension which is thoroughly mixed in the dough to form a uniform distribution of the additive. Since this involves the addition of water to the dough, allowance must be made for the water incorporated with the additive, and compensation may be required in respect to the quantity of other water added. If the dough is made from limed corn flour, the additive may be dissolved or suspended in the water which is subsequently to be mixed with the flour in order to make the dough. It will be understood that where the additive acts to increase the yield, the total amount of water used to make the dough of a certain consistency is greater than if the additive was not employed.

In some cases it is preferred to mix the additive with the dry limed corn flour prior to mixing the flour with the water.

EPICHLOROHYDRIN

Epichlorohydrin cross links or cross bonds with starch and is effective to increase the flexibility of tortillas after storage for a period of time without loss of moisture if incorporated in the dough in the range between 0.25% and 1% of the weight of the tortillas.

Epichlorohydrin must be added under alkaline conditions at a pH of 8 to 10 in the dough.

Table 2 shows the increase in flexibility at room temperature of tortillas due to the addition of epichlorohydrin.

TABLE 2

Typical values of flexibility index at room temperature obtained by addition of epichlorohydrin to tortillas

| Dose of epichlorohydrin based on weight of tortillas, percent | Flexibility index after— | | | |
|---|---|---|---|---|
| | 0 hr. | 24 hr. | 48 hr. | 72 hr. |
| 0.0 (Control) | 8.5 | 7.7 | 6.5 | 6.0 |
| 0.5 | 8.7 | 8.0 | 7.0 | 6.7 |
| 1.0 | 8.8 | 8.3 | 7.5 | 7.0 |

The epichlorohydrin may be incorporated directly into the tortilla flour which is used in making up the dough. In such case, the alkaline material, usually sodium hydroxide, is added dissolved in the water which is mixed with the flour in order to make up the dough.

Again, the epichlorohydrin may be dissolved, together with the alkaline material, in the water which is subsequently mixed with the flour in order to make up the dough.

Finally, the epichlorohydrin may also be dissolved, together with the alkaline material, in a portion of water which is subsequently mixed with dough previously made either directly from limed corn or from limed corn flour. In such case due compensation must be made for the water added to the dough in this manner.

EXAMPLE 1

Nixtamalized corn flour is mixed in a dough mixer with about 130 percent of water on the weight of the dry materials, the water having incorporated within it 1% of epichlorohydrin on the weight of the tortillas, and sufficient sodium hydroxide to adjust the pH of the dough to a value of 9.5. The result is shown in the table.

EXAMPLE 2

The procedure of Example 1 is followed except that the dough is made and then a 2% water solution of epichlorohydrin and sufficient sodium hydroxide to adjust the pH of the dough to 9.5 is incorporated into the dough mixer, due allowance being made for the water.

EXAMPLE 3

Nixtamalized corn flour is mixed in the dry state with 1% epichlorohydrin on the weight of the tortillas. The flour with the epichlorohydrin is subsequently mixed with about 130 percent of water on the weight of the dry materials, the water having incorporated within it sufficient sodium hydroxide to adjust the pH of the dough to 9.5.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my claims.

Having thus described my invention, what I claim as new and desire to secure by Letters Patent is:

1. A process of producing tortilla dough which will make tortillas which retain their flexibility after storage for a time without loss of moisture, which comprises mixing together nixtamalized corn or nixtamalized corn flour with water to make tortilla dough and incorporating in the dough having a pH of 8 to 10, from 0.25 to 1% by weight of the tortilla, of epichlorohydrin.

2. Tortilla dough produced by the method of claim 1.

References Cited

UNITED STATES PATENTS 2,584,893   2/1952   Lloyd et al. ---------- 99—93

OTHER REFERENCES

Zelayeta: "Elena's Secrets of Mexican Cooking," Prentice-Hall Inc., Englewod Cliffs, N.J., March 1962, pp. 115–121.

RAYMOND N. JONES, Primary Examiner

U.S. Cl. X.R.

99—153